3,093,500
CREEP REDUCTION IN ASPHALTIC PAVING
George M. Jones, Salt Lake City, Utah, assignor to American Gilsonite Company, Salt Lake City, Utah, a corporation of Delaware
No Drawing. Filed June 22, 1959, Ser. No. 821,654
3 Claims. (Cl. 106—273)

This invention pertains to the art of asphaltic paving, and has for its principal object the production of a hot application paving material, and methods for its preparation, which paving shall be characterized by relative ease of production, and most especially an unusually high resistance to "creep," by which I mean a tendency to flow, shove, abrade or rut under traffic loads.

The chemical and rheological study of asphalts and similar bituminous materials is complicated by the fact that, as used commercially, they are not simple compounds, but rather mixtures or molecular combinations of very complex form and correspondingly high molecular weight. For this reason, such materials are defined commercially either simply by some indication of their origin, such as in the term "Trinidad asphalt," or somewhat more technically by specifications as to their softening temperature, penetration grade, and the like. By penetration is meant the distance, in tenths of a millimeter, that a specified test needle will penetrate into a sample of the material, when loaded with a weight of 100 grams, for a period of 5 seconds, A.S.T.M. Method D–5. The penetration value is thus related to viscosity, and can be approximately correlated to other viscosity measurements; it is, of course, directly affected by the temperature of the sample, so that it is necessary to specify the temperature at which the stated value applies, unless the context indicates that ordinary ambient temperatures, such as 77° F., are to be understood.

It has long been known that a paving asphalt intended for combining with mineral aggregates (crushed stone, sand and the like) can be produced by blending asphalts of different types to yield the desired high softening temperature, and other properties, in the finished pavement. There are a variety of asphalt types, including various natural materials as mentioned above, and petroleum distillate residues also of differing properties. In addition, blending, mixing and laying techniques include the use of such asphalts in combination with mineral oils; for example, the so-called cut-back asphalts including solvents such as naphtha, gasoline, kerosene, fuel oil and the like. Both hot and cold applications are possible, and the prior art affords many descriptions of suitable materials and processes, the choice depending upon the availability of materials and handling equipment, the speed with which the work must be accomplished, and the time available for curing; the latter being especially applicable where slow evaporation or hardening of a solvent oil must be complete before the pavement is opened to traffic.

All known asphaltic pavements are deficient in their resistance to flow or creep under actual traffic loads, especially at higher ambient temperatures. Those skilled in the art realize fully that if the asphaltic binder employed is blended so as to be satisfactorily stiff at an ambient temperature of (say) 110° F., then it will be brittle and readily fractured when the temperature drops to 30° or lower, or at some intermediate temperature. Moreover, the resulting lowering of the penetration value would involve seriously increased costs due to lowered workability at the site under ordinary working temperatures. Compromises thus have to be made, at one or both ends of the expected temperature range, and as a matter of fact, frequent maintenance and repair work is required where the pavement is especially ill-treated. Such conditions occur in parking lots where starting and stopping of vehicles is the rule, and where the use of power steering apparatus with the vehicle stationary can easily form ruts and the like; similar conditions obtain near traffic lights and bus stops on open streets and roads.

It has apparently always been assumed by workers in this art that there is a direct and universal correlation between the softening temperature on the one hand, and penetration and creep values on the other; that is, that any blend having a higher softening temperature (A.S.T.M. Method D36–26) than another would also exhibit a lower creep value, and a lower value of penetration. Thus, for example, it has been assumed to be impossible to blend with a low-softening temperature asphalt (and having a high penetration), a sufficient quantity of a high-softening temperature asphalt to make a paving which is stable against creep at elevated temperatures and yet has a sufficiently high penetration or workability to permit it to be handled and laid with usual equipment and techniques.

My invention is based upon the discovery that the particular form of asphalt known as "gilsonite" is capable of imparting to an asphaltic pavement a desirably high resistance to creep and flow, even at relatively elevated temperatures, when admixed with other asphaltic binders in a much lower proportion than would have been predicted on the basis of the present knowledge in this industry; specifically, when admixed in a proportion which is so low that it has substantially no adverse effect on the workability of the paving mixture.

Gilsonite, also called uintaite, is a black, lustrous variety of asphalt occurring naturally on a large scale only in the Uintah basin of eastern Utah and western Colorado. It has a molecular weight of about 1500, a softening temperature which varies from 200 to 450° F., depending upon the vein from which it is taken, and is composed of about 86% carbon, 11% hydrogen and 3% nitrogen. It is, in general, soluble in petroleum oils, but relatively insoluble in the more volatile petroleum solvents such as naptha, gasoline and kerosene. It has no known artifical counterpart, and its penetration value is zero at 77° F., which prevents its use as a binder or paving material except as an additive or in solution. It has been used with various fluxing oils to produce cold asphaltic pavement, and it has also been used when blended with penetration grade asphalts in amounts of not less than 15% gilsonite, together with hot oils or fluxes, to produce hot mixed pavements having the desired softening temperatures and penetrations; however, all such combinations have always been subject to the objectionable creep and flow in the finished pavement as described above.

I have found that the addition of relatively small amounts of gilsonite, to other asphalts of penetration grades, produces a wholly unexpected increase in the resistance of the finished paving to flow, creep and the other distortions already mentioned. The proportion needed to effect this result is grossly below any percentage in which the new property could be attributed merely to a proportional increase in the softening temperature of the binder itself as a whole, and moreover the useful percentage is such that it does not appreciably alter the workability of the other asphalt employed.

While I do not wish to be restricted to any particular theory of the reason for the effects noted, it appears that the common presumption in this art, that flow and creep are necessarily correlated to the softening temperature and the penetration values of the binder as measured in the laboratory, is erroneous. It may be that the flow and creep which occur in actual use of the pavement are due to the relatively long-term application of distorting forces as compared with the 5-second test which is standard for needle penetration values, or it may be that there is a difference in kind as between needle penetration and the abrading, scuffing, rubbing and surface-shearing forces to which pavements are exposed under traffic conditions. What ever the reason, I have established experimentally, in actual installations, that the addition of gilsonite to regular asphaltic binders of "penetration" or paving grades, in amounts of the order of 5% of the total binder mass, is sufficient to solve the creep problem completely; whereas, on the basis of its effect merely on softening temperature or penetration, such an amount would be required as to render the binder wholly unsuited to paving operations, due to its high viscosity at any practical application temperature and its general unmixability and unworkability.

The actual percentage of gilsonite to be added to the penetration grade asphalt to obtain the stated results will vary somewhat, depending upon the characteristics of the latter and the working conditions which will obtain. In any case, however, the percentage of gilsonite is far below any value which would adversely affect the workability of the whole mixture. Moreover, the amount of gilsonite to be added is insufficient to make a material change in the softening temperature of the mixture. I have therefore concluded that the action involves more than mere blending of properties, with the usual proportionate changes in those properties as normally specified for paving asphalts, and is possibly related in some way to the particular molecular shape or other internal physics of the gilsonite. This view is reenforced by my knowledge that the addition to ordinary paving asphalts of similar amounts of other low-penetration and high-softening-temperature asphalts does not produce the desired, or indeed any, unexpected increase in the resistance of the finished pavement to traffic-induced flow, creep, shove and so on. Only gilsonite seems to exhibit this advantage.

As already indicated, I believe that approximately 5% is the optimum proportion of gilsonite to be used, by weight, in preparing the paving material. However, slight variations within the range of from 3% to 7% have been employed with the same results, depending upon the other asphalt used. Percentages of gilsonite much above the upper figure will, of course, tend to reduce the penetration and increase the softening point unduly, as recognized by the prior art, and must be avoided for the practical reasons of workability as mentioned above.

Preferably, in order to obtain a uniform mixture of the gilsonite in the paving mixture, it is first puverized; the pulverized gilsonite is available commercially, since it is widely used with fluxing oils to form an asphaltic binder for use either hot or cold. The procedure employed is simply the placing of the weighed batch of mineral aggregate (stone chips or the like) in a pugmill whose paddles are turning continuously while the weighed quantity of pulverized gilsonite is added to the mill contents; if the aggregate consists of various grades, as is usually the case, then the mill should be running before the gilsonite is added so that mixing of the aggregate grades has already been carried out to a degree. In this way, the pulverized gilsonite is also mixed thoroughly amongst the aggregate. When all of the gilsonite has been placed in the pugmill, the hot asphalt cement, of the specified penetration and other specifications, is added to the mill while it is running, and mixing continues until all of the aggregate particles have been completely coated.

*Example A*

By way of a specific example illustrating the preferred proportions as employed for the paving of the parking lot of a restaurant, located in a warm climate and subjected to heavy duty from vehicles, both stopping, starting and performing power-steering operations while stationary, to two tons of minus half-inch dense graded aggregate were added 6.2% of 85–100 penetration asphalt cement and 6.5 pounds per ton of pulverized gilsonite. The percentages are as follows:

|  | Pounds | Percent |
| --- | --- | --- |
| Total aggregate | 4,000 | 93.87 |
| Asphalt cement, 4,000×0.062 | 248 | 5.82 |
| Gilsonite | 13 | 0.31 |
| Total | 4,261 | 100.00 |

Or, considering the bitumen only:

|  | Pounds | Percent |
| --- | --- | --- |
| Asphalt cement | 248 | 95.02 |
| Gilsonite | 13 | 4.98 |
| Total | 261 | 100.00 |

After months of usage, this paving had not been distorted by cars standing in one place for long periods, indicating a high resistance to creep. Also, the paving is free from abrasion by power-steered front wheels of standing cars, indicating high cohesiveness of the binder. Finally, adequate ductility of the binder is demonstrated by freedom from cracking of the pavement, even during cold weather.

*Example B*

This example illustrates the application of my invention to the production of abrasion-resistant bituminous curbing:

|  | Pounds | Percent |
| --- | --- | --- |
| Total aggregate | 1,870 | 93.50 |
| 100–12-penetration asphalt cement | 125 | 6.25 |
| Gilsonite | 5 | 0.25 |
| Total | 2,000 | 100.00 | or, considering the bitumen only

|  | Pounds | Percent |
| --- | --- | --- |
| Asphalt cement | 125 | 96.15 |
| Gilsonite | 5 | 3.85 |
| Total | 130 | 100.00 |

The bituminous curbing made according to this formulation is far superior in resistance to abrasion to that made without gilsonite.

I have found that it is also possible to add the specified amount of gilsonite to the other asphaltic binder in advance of the coating of aggregate with the composition, since the proportion of gilsonite required is insufficient to seriously alter the properties of the balance of the binder with respect to its shipment and handling. For example, for use with any suitable grade of paving asphalt, the gilsonite may be added thereto as an incident of the blending, distillation (for petroleum asphalts) or other manufacturing operations, and the mixed binder then supplied to users who will add it, after heating, to their locally prepared aggregates.

What is claimed is:

1. A paving cement for use as a binder for mineral aggregates to form a hot laid pavement having high creep resistance, which consists essentially of from about 3% to about 7% by weight of gilsonite admixed with an asphalt having a penetration of about 60 to about 300.

2. A paving material for hot application to roads and the like, consisting essentially of a graded mineral aggregate of a size and grading as customarily used for paving purposes, said aggregate being coated with an asphaltic cement consisting essentially of an asphalt having a penetration in the range of about 60 to about 300, and from about 3% to about 7% by weight of said cement of gilsonite, said composition when laid according to the usual hot paving methods yielding a pavement of high creep resistance.

3. A method of preparing an asphaltic pavement resistant to creep and plastic flow under traffic conditions, which comprises forming a mixture of mineral aggregate of the usual size and grading as employed for paving purposes, and an asphaltic cement consisting essentially of asphalt and about 3% to about 7% by weight of gilsonite, said asphalt having a penetration of about 60 to about 300, and laying said pavement while said mixture is heated to a temperature of at least the softening point of the asphaltic cement.

References Cited in the file of this patent

UNITED STATES PATENTS

| | | |
|---|---|---|
| 1,405,302 | Downard | Jan. 21, 1922 |
| 1,650,047 | Sadtler | Nov. 22, 1927 |
| 1,662,377 | Downard | Mar. 13, 1928 |
| 1,940,645 | Fletcher | Dec. 19, 1933 |
| 2,909,441 | Pickell | Oct. 20, 1959 |